United States Patent [19]
Robertson et al.

[11] Patent Number: 5,949,430
[45] Date of Patent: Sep. 7, 1999

[54] PERIPHERAL LENSES FOR SIMULATING PERIPHERAL VISION ON A DISPLAY DEVICE

[75] Inventors: George G. Robertson; Daniel C. Robbins, both of Seattle, Wash.

[73] Assignee: Microsoft Corporation, Redmond, Wash.

[21] Appl. No.: 08/859,605

[22] Filed: May 20, 1997

[51] Int. Cl.⁶ ................................................. G06F 15/00
[52] U.S. Cl. ............................................................. 345/433
[58] Field of Search .................................. 345/433, 435, 345/440; 358/450

[56] References Cited

U.S. PATENT DOCUMENTS 5,708,826  1/1998  Ikeda et al. ............................. 345/348
5,724,074  3/1998  Chainani et al. ....................... 345/474

OTHER PUBLICATIONS

Robertson, G. et al., "Immersion in Desktop Virtual Reality," Microsoft Corporation, Redmond, WA, Oct. 15, 1997.
Spence, R. et al., "Data Base Navigation: An Office Environment for the Professional," *Behaviour and Information Technology* 1:1, pp. 43–54, 1982.
Hearn, D. et al., *Computer Graphics*, 2nd Ed., pp. 75–81, 447–451, 552, 1986.
Foley et al., *Computer Graphics*, 2nd Ed., pp. 758–761, 1987.
Glassner, A.S., *3D Computer Graphics: A User's Guide for Artists and Designers*, 2nd Ed., pp. 71–86, 127–138, 1989.
OpenGL®™ *The Leading Visual Programming Interface*, Silicon Graphics, Inc., 1994.
Segal, M. et al., *The OpenGL Graphics System: A Specification* (Version 1.1), Silicon Graphics, Inc., 1992.

*Primary Examiner*—Phu K. Nguyen
*Attorney, Agent, or Firm*—Christensen O'Connor Johnson & Kindness PLLC

[57] ABSTRACT

Peripheral lenses provide simulated peripheral vision on a display device. One or more peripheral lenses may be provided to generate peripheral views corresponding to portions of peripheral vision. In a first alternative, multiple viewing frustums are utilized. A first viewing frustum is utilized to define a main view of a scene and additional viewing frustums are defined for each peripheral lens. The viewing frustums of the peripheral lenses are angularly offset relative to the viewing frustum for the main view and share a boundary with the viewing frustum for the main view. In a second alternative, a reflective object is positioned within a scene to yield peripheral views of the scene. Environment mapping is employed to determine how objects in the scene are reflected off the reflective object. The reflective object may be dynamically altered to modify the resulting peripheral view.

52 Claims, 16 Drawing Sheets

PERIPHERAL LENSES FOR SIMULATING PERIPHERAL VISION ON A DISPLAY DEVICE

TECHNICAL FIELD

The present invention relates generally to data processing systems and, more particularly, to three dimensional navigation and to peripheral lenses that simulate peripheral vision on a display device.

BACKGROUND OF THE INVENTION

Conventional graphics packages provide resources for rendering a two-dimensional view of a three dimensional scene. These graphics packages generally include functions for generating respective picture components within the scene. These functions may be used by programs written in high-level programming languages. An example of such graphics package is the OpenGL standard developed by Silicon Graphics, Inc. OpenGL includes functions for generating picture components such as straight lines, polygons, circles, and the like.

FIG. 1 is a flowchart that depicts the steps that are performed in a conventional graphics package to render a two-dimensional view of a three dimensional scene. Initially, objects that are resident within the three dimensional scene must be modeled (step 102 in FIG. 1). In general, models of the objects that inhabit the scene are constructed out of simpler surfaces ("primitives") that are combined to make more complex objects. Examples of such primitives include polygons and triangles. FIG. 2 shows an example of how a five-pointed star A may be formed from triangles B, C, D, E, and F and a pentagon G. The vertices within the star and the primitives are numbered 1–10. For more sophisticated objects, triangular meshes and other polygon representations may be utilized to model the objects. The models of the objects are generally specified in Cartesian coordinates as part of a modeling coordinate system.

The next step in developing a two-dimensional view of a three dimensional scene is to position the modeled objects in the three dimensional space that constitutes the scene (step 104 in FIG. 1). The scene has its own coordinate system, known as a world coordinate system. Transformations are applied to the models of the objects to position the objects within the world coordinate system.

In order to obtain a perspective view of the three dimensional scene, a frustum is defined (step 106 in FIG. 1). FIG. 3 depicts an example of a frustum 300. The frustum 300 constitutes the truncated pyramid formed by the volume between a near clipping plane 304 and a far clipping plane 302. The frustum 300 is used to determine the view 308 that will be obtained for the three dimensional scene, where the view is a perspective view. Reference point 310 constitutes the apex of a viewing pyramid that includes the frustum 300. The apex of the viewing pyramid constitutes a reference point where a viewer's eye is positioned in rendering the viewscreen 308. This viewing volume 306 holds the objects that may potentially be visible on the viewscreen 308. Defining the frustum 300, in step 106, entails defining the far clipping plane 302, the near clipping plane 304, and the positioning of the viewscreen 308 relative to the apex 310 and the near clipping plane 304. Objects within the viewing volume 306 are projected onto the viewscreen 308 to create the view. In particular, a perspective transformation is applied to project the objects in the viewing volume 306 onto the viewscreen 308 so that more distant objects appear smaller than closer objects. The view is then rendered on a display device (step 106 in FIG. 1). Transforms are applied to convert the view into device coordinates that are used by an output device.

Such rendering of two-dimensional views of three dimensional scenes has been widely used in virtual reality applications and desktop 3D. Many virtual reality systems provide a three dimensional space in which a user may be immersed. Typically, a user may navigate throughout the immersive three dimensional space. The two-dimensional view of the three dimensional space is updated as the user moves through the three dimensional space.

Unfortunately, such virtual reality systems suffer a number of drawbacks. First, these virtual reality systems suffer from "magical appearance syndrome," wherein a user magically appears within the three dimensional space. There is no initial place to which a user navigates; instead, the user magically appears within the three dimensional space. As a result, it is difficult for a user to become properly oriented within the three dimensional space. Second, it is difficult to navigate within such three dimensional spaces because a user is not given the same information that a user is provided when moving about the real world. In particular, people typically make significant use of peripheral vision and such peripheral vision is absent from desktop based 3D virtual reality systems.

SUMMARY OF THE INVENTION

The limitations of the prior art are overcome by the present invention which provides one or more peripheral lenses to simulate peripheral vision on a display device. The peripheral lenses provide separate peripheral views of a scene that are displayed adjacent to a main view of the scene. Multiple peripheral lenses may be displayed adjacent to a given main view. These peripheral lenses, provide a viewer with visual cues that help user to navigate and build a mental model of a space which through the viewer is navigating.

The lenses, besides providing a wider (augmented) field of view, also provide a wider "field-of-reach": the user can move his or her representation of his or her hand beyond the confines of that part of the 3D scene which is shown in the main view.

According to a first aspect of the present invention, a scene is provided that holds at least one object. A main view of the scene that depicts a main portion of the scene is defined. A first peripheral lens view of the scene is defined. The first peripheral lens view is angularly offset relative to the main view of the scene. It shows a first peripheral portion of the scene that directly abuts the main portion of the scene. The main view and the first peripheral lens view are rendered together on a display device.

In accordance with another aspect of the present invention, a scene that includes at least one object is modeled. A first viewing frustum is defined for the scene to define a main view of the scene. The first viewing frustum includes two boundaries that bound the first viewing frustum in a given dimension. A second viewing frustum is defined for the scene to define a first peripheral lens view of the scene. The second viewing frustum includes boundaries where one of these boundaries of the second viewing frustum is a shared boundary that is also one of the boundaries of the first viewing frustum. The main view of the scene is output together with the first peripheral lens view of the scene on the output device.

In accordance with an additional aspect of the present invention, a three dimensional scene that includes at least one object is modeled. A reflective object is added to the scene. The reflective object includes a first portion for reflecting a main view of the scene and a second portion for reflecting a peripheral view of the scene. The second portion is angularly offset relative to the first portion. The main view of the scene and the peripheral view of the scene are identified by performing environment mapping, ray tracing, ray casting, or any other commonly used method for generating renderings of reflective surfaces. The identified main view of the scene and the identified peripheral view of the scene are displayed on a display device.

In accordance with a further view of the present invention, a model of a three dimensional space that includes an object is provided. A main view of the scene that depicts a main portion of the scene is defined. A peripheral lens is provided that provides a peripheral view of the scene that depicts a peripheral portion of the scene that is immediately adjacent to the main view. The main view is seamlessly rendered with the peripheral view on a display device.

BRIEF DESCRIPTION OF THE DRAWINGS

A preferred embodiment of the present invention will be described below, relative to the following figures.

DETAILED DESCRIPTION OF THE INVENTION

The preferred embodiment of the present invention provides peripheral lenses that simulate peripheral vision on a display device. These peripheral lenses may assist a user in navigating a virtual three dimensional space. The peripheral lenses may, in a first alternative, be implemented by defining multiple viewing frustums relative to a single three dimensional scene. The first frustum is used to define a main view of the scene and then a second and third frustums are defined for the peripheral lenses that are resident at the left and right sides of the main view. These additional frustums define the views of the peripheral lenses. The resulting display that is shown to a user includes a main view with two adjacent peripheral lenses views that provide a seamless depiction of a three dimensional scene. While there is a change in the perceived angles of the views, portions of the three dimensional space that are depicted by the main view and the peripheral lenses views are contiguous. No portions of the three dimensional space are omitted and no portions of the three dimensional space are redundant within the views. The peripheral lenses provide views that simulate peripheral vision relative to the main view.

In a second alternative, an object having a reflective surface is positioned within a scene that is to be rendered, and a view of the reflective object is obtained. As will be described in more detail below, the reflective object should be curved to provide peripheral lenses. Environment mapping is performed and a field of view is defined relative to the reflective surface to produce a view which is then flipped about the central vertical axis to produce the resulting seamless desired view. It should also be noted that the frustum and reflective surface are moved in conjunction (scale, rotate, and translate) "backwards" through the scene, e.g., the frustum is aimed opposite the direction of the desired rendered view. For example, to render a view of the scene such that a particular object is displayed correctly in the final rendered image, the frustum must be aimed away from the object (towards the reflective surface).

Although the present invention will be described below relative to an implementation in which a two-dimensional view of a three dimensional scene is obtained, those skilled in the art will appreciate that the present invention may also be practiced in other environments. For example, the present invention may be practiced to yield views of two-dimensional space.

Figure 1:
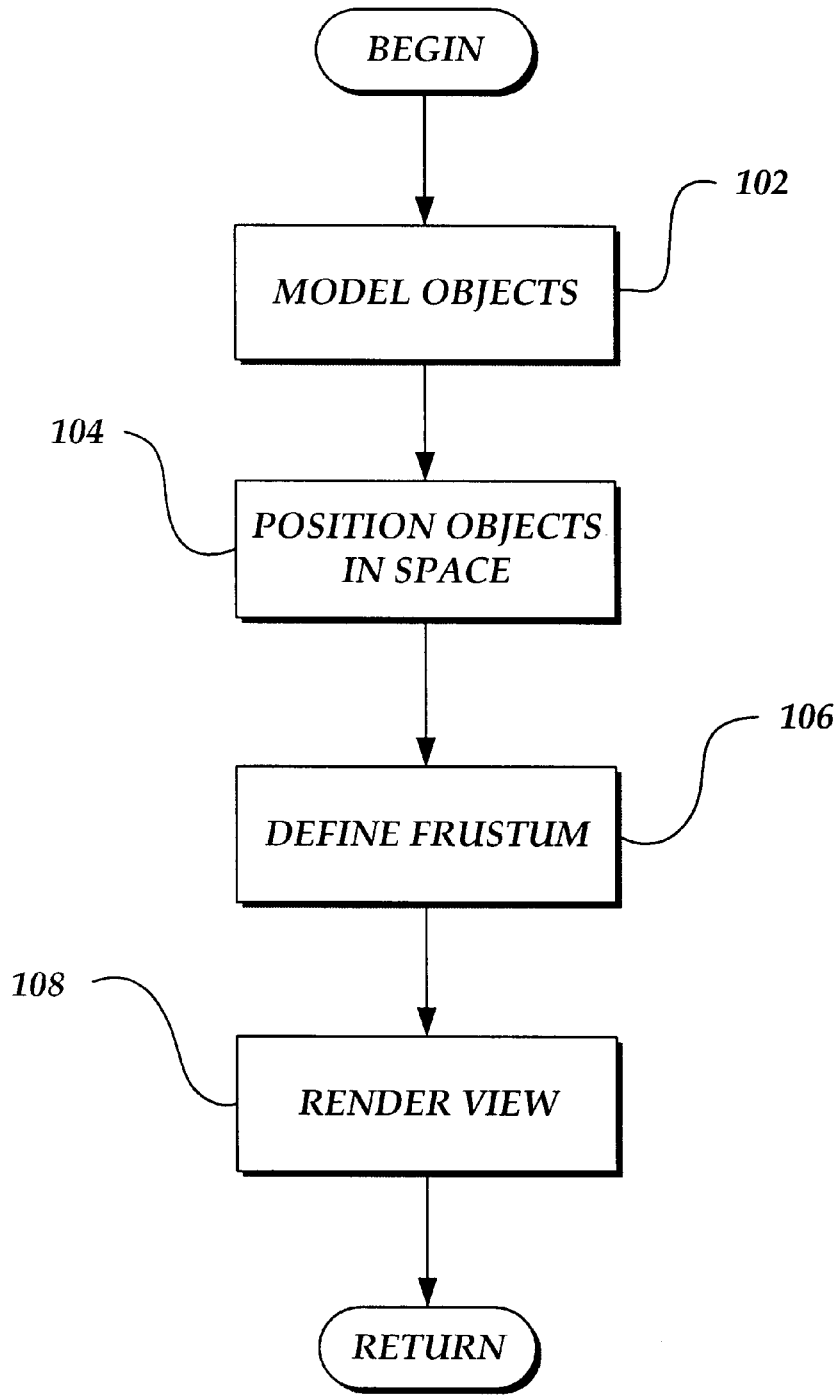
FIG. 1 depicts a conventional method for providing a two dimensional view of a three dimensional scene.
Figure 2:
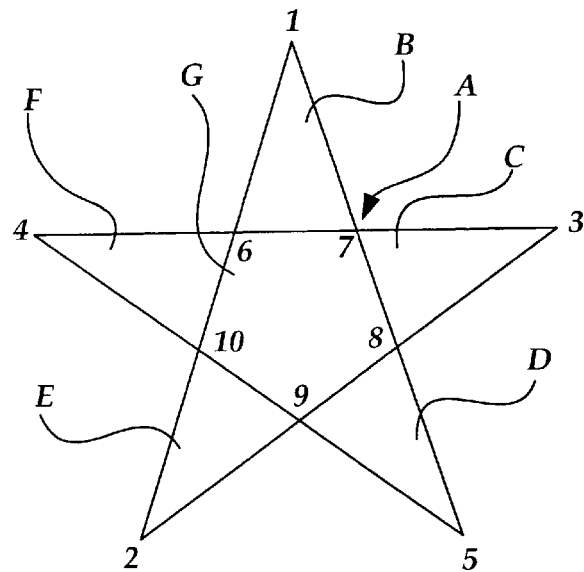
FIG. 2 illustrates how a five pointed star may be modeled by triangles and a pentagon in a conventional system.
Figure 2:
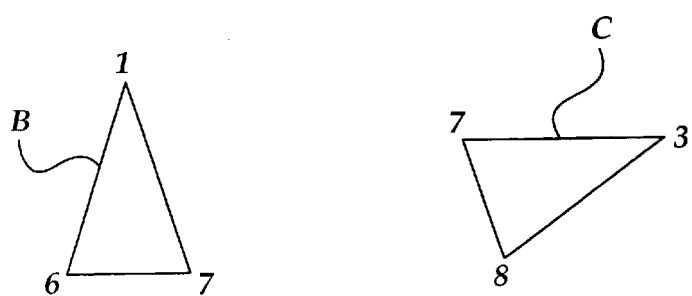
Figure 2:
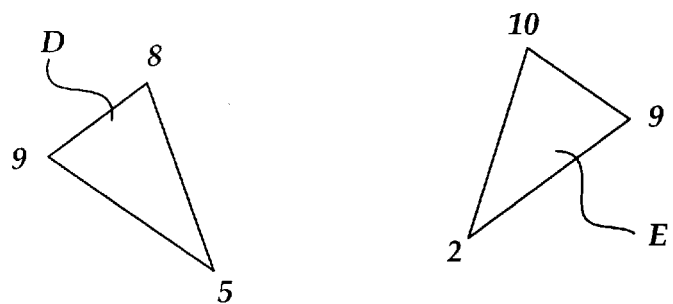
Figure 2:
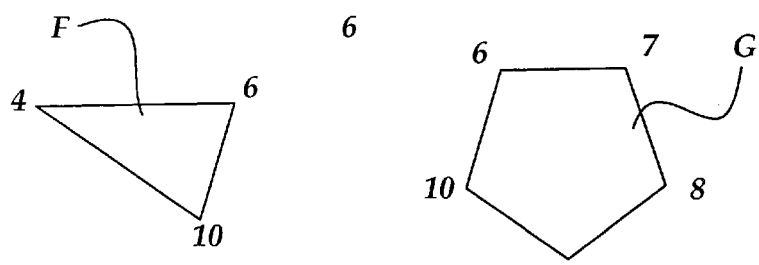
Figure 3:
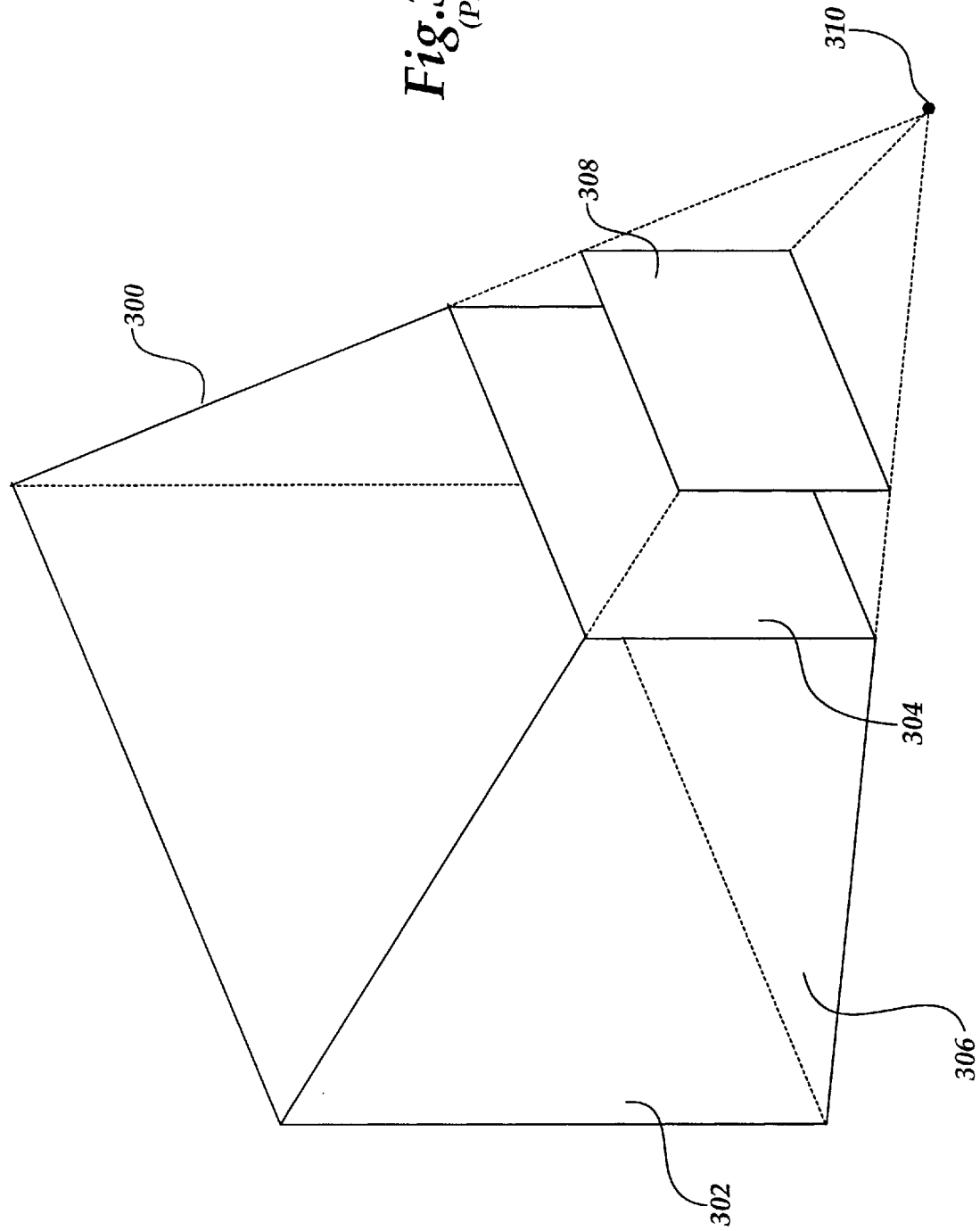
FIG. 3 depicts a conventional frustum that is used by a graphics package.
Figure 4:
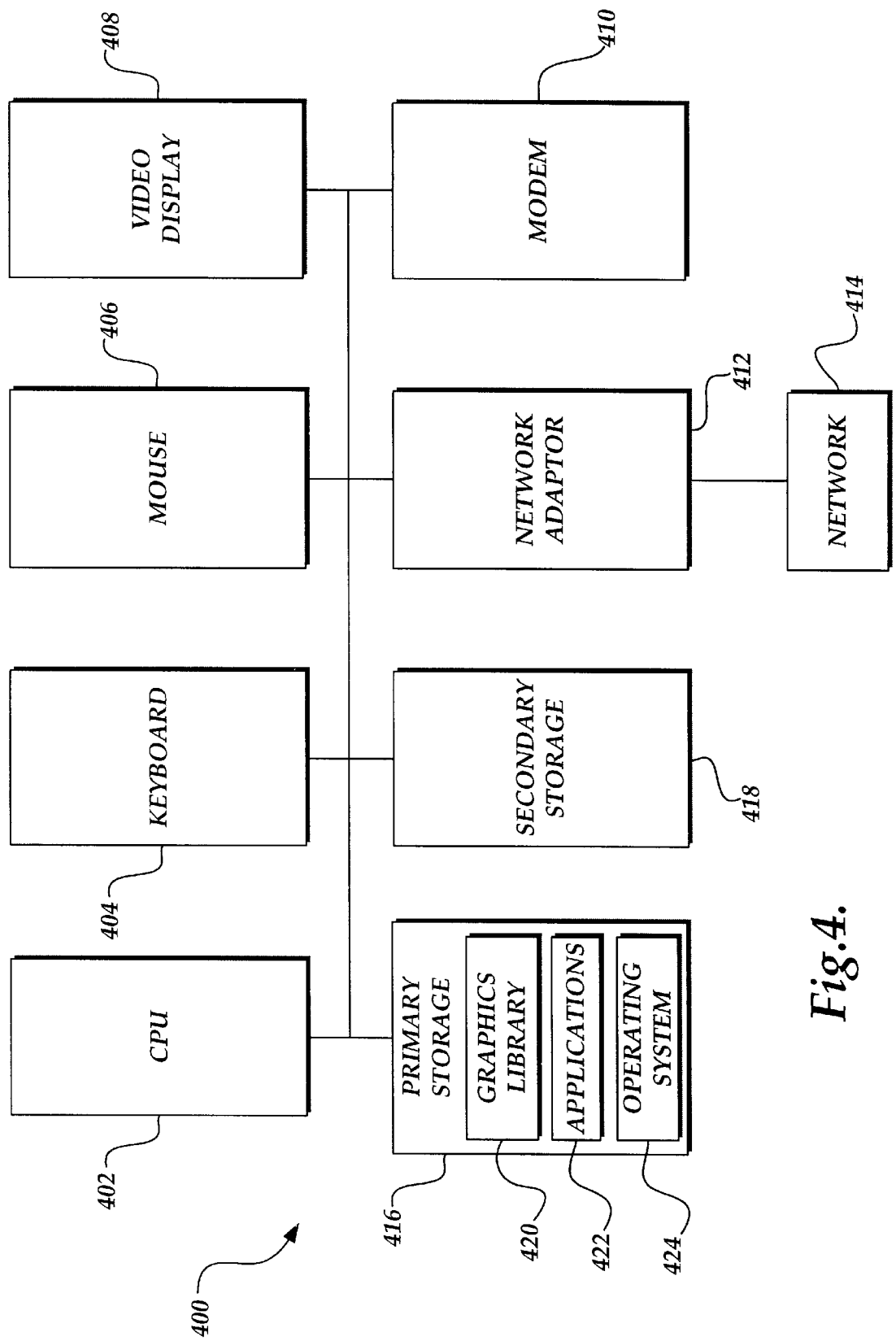
FIG. 4 is a block diagram of a computer system that is suitable for practicing the preferred embodiment of the present invention.

FIG. 4 depicts a computer system 400 that is suitable for practicing the preferred embodiment of the present invention. Those skilled in the art will appreciate that the computer system 400 shown in FIG. 4 is intended to be merely illustrative. The present invention may also be practiced in different computer system configurations, including multi-processor configurations and distributed configurations.

The computer system 400 includes a central processing unit (CPU) 402 that oversees operation of the computer system. The computer system 400 may also include a number of peripheral devices, including a keyboard 404, a mouse 406, and a video display 408. A modem 410 may be provided with the computer system 400 to enable the computer system to communicate with telephone lines. A network adapter 412 may be provided within the computer system 400 to interface with a network 414. The network 414 may be a local area network (LAN) or a wide area network (WAN). Primary storage 416 and secondary storage 418 are also provided within the computer system 400. The primary storage 416 may hold copies of a graphics library 420, such as the OpenGL graphics library from Silicon Graphics, Inc. The primary storage 416 also holds application programs 422 that utilize the graphics library 420 to render graphics. These application programs 422 may include, for example, virtual reality programs and more conventional business-oriented programs, such as word processing programs, spreadsheet programs or the like. The primary storage 416 also holds a copy of an operating system 424, such as the Microsoft® Windows® 95 operating system from Microsoft Corporation. The secondary storage 418 may include drives for computer-readable storage mediums, such as floppy disks and CD-ROMs.

Figure 5A:
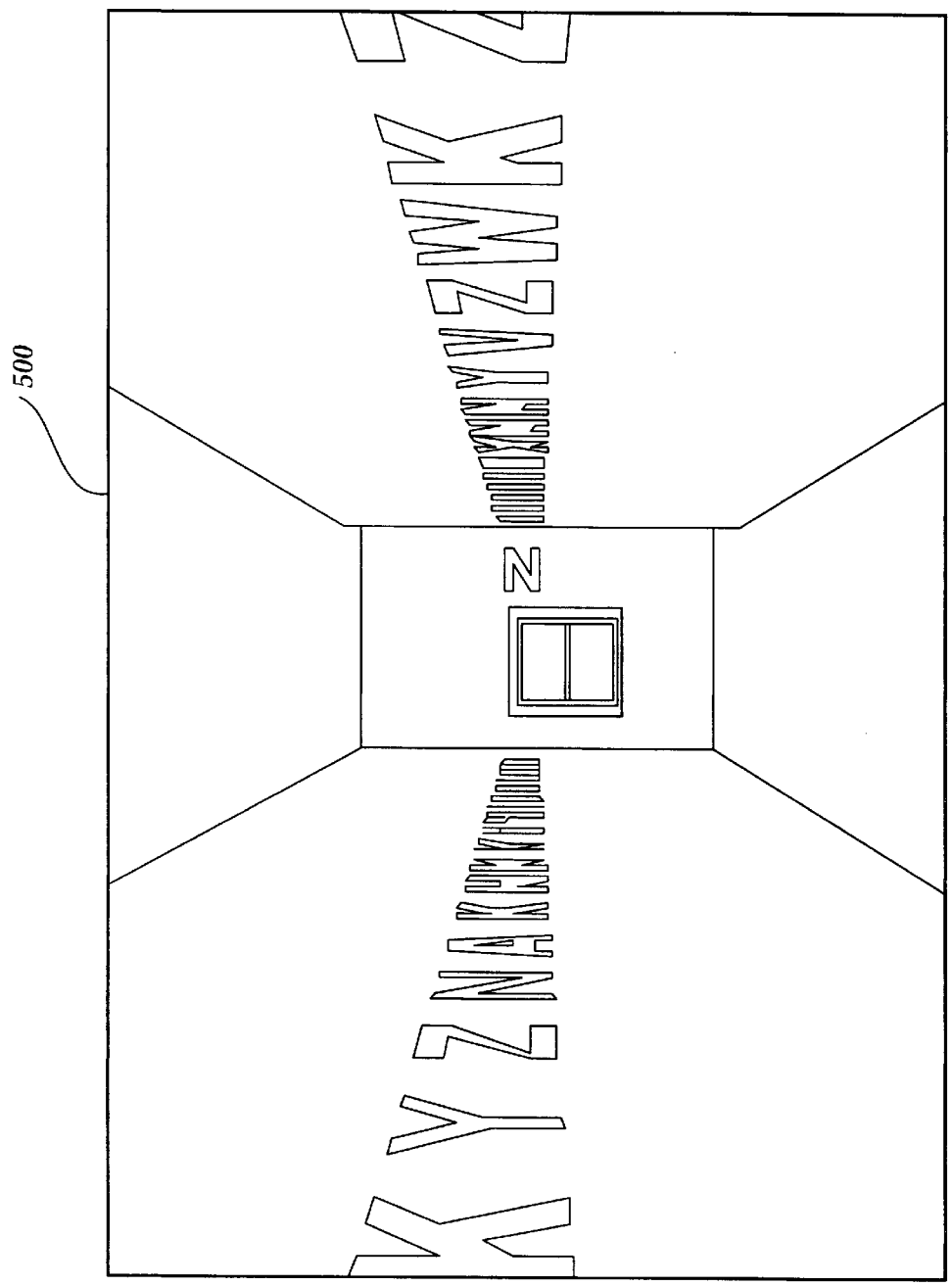
FIG. 5A depicts a main view of a three dimensional space without peripheral lenses.
Figure 5B:
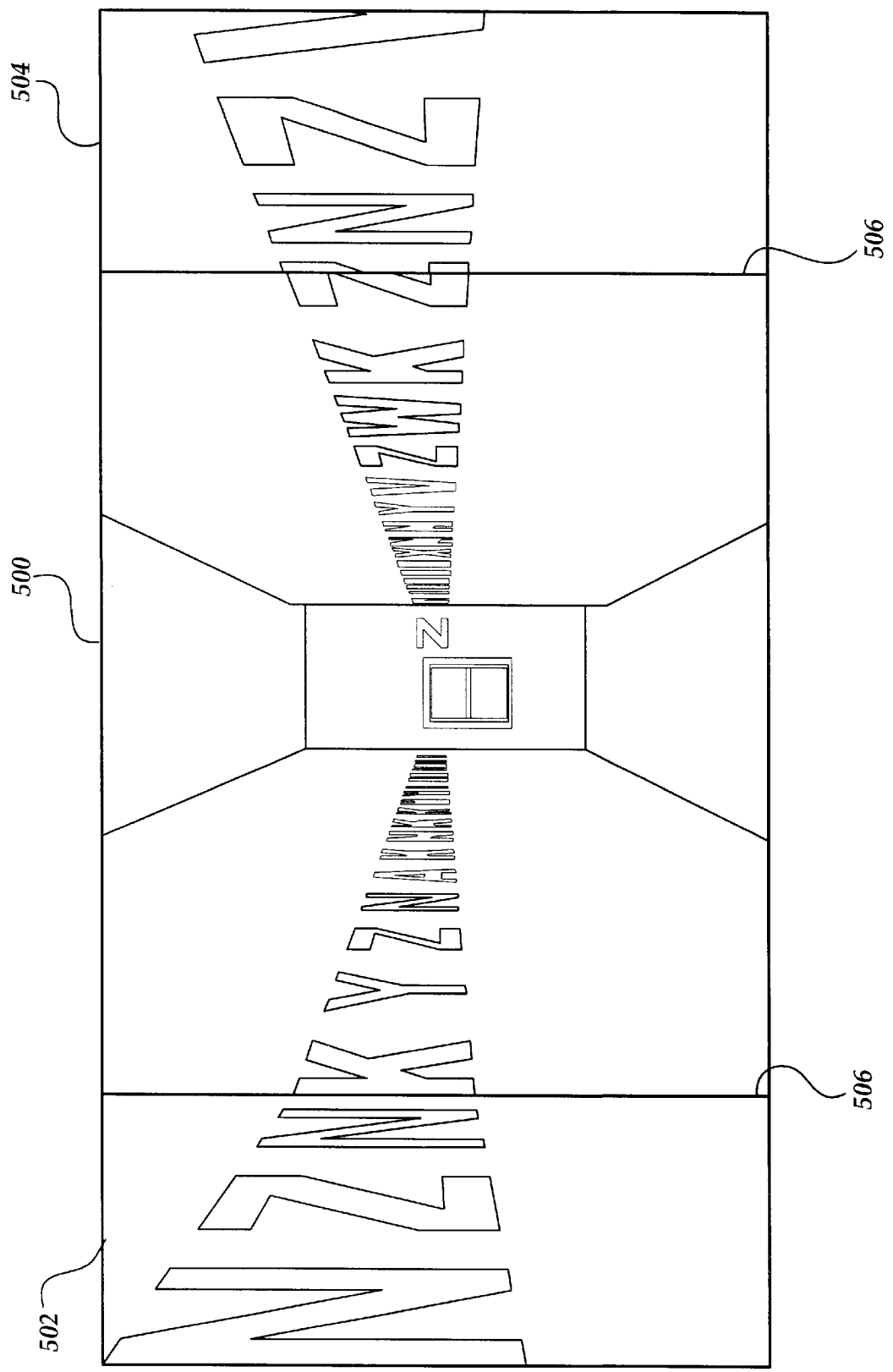
FIG. 5B depicts a main view of a three dimensional space with peripheral lenses.

In order to gain an appreciation of the visual effect produced by peripheral lenses of the preferred embodiment of the present invention, it is helpful to consider an example. FIG. 5A depicts an example of a main view of a three dimensional space. The three dimensional space includes a hallway that has a window at the end and walls that include letters. The view 500 shown in FIG. 5A is a perspective view looking down the hallway towards the window. FIG. 5B shows the effect of adding peripheral lenses to add peripheral views 502 and 504 to the main view 500. The peripheral views 502 and 504 are immediately adjacent to the main view so that they directly abut the main view. The peripheral view frustums are slightly angled relative to the main view frustum. Preferably, each peripheral view is angled a like magnitude relative to the main view. As will be described in more detail below, the extent of the angular offset of a peripheral view to the main view is adjustable. The peripheral lenses increase the range of what is visible to the viewer to include information that would typically be visible in a peripheral view. These peripheral lenses assist the user in navigating the three dimensional virtual space and provide the viewer with additional visual cues that assist the viewer in building a mental model of the three dimensional virtual space. In this example, each peripheral lens is the same height as the main view and is one-third the width of the main view.

Figure 6:
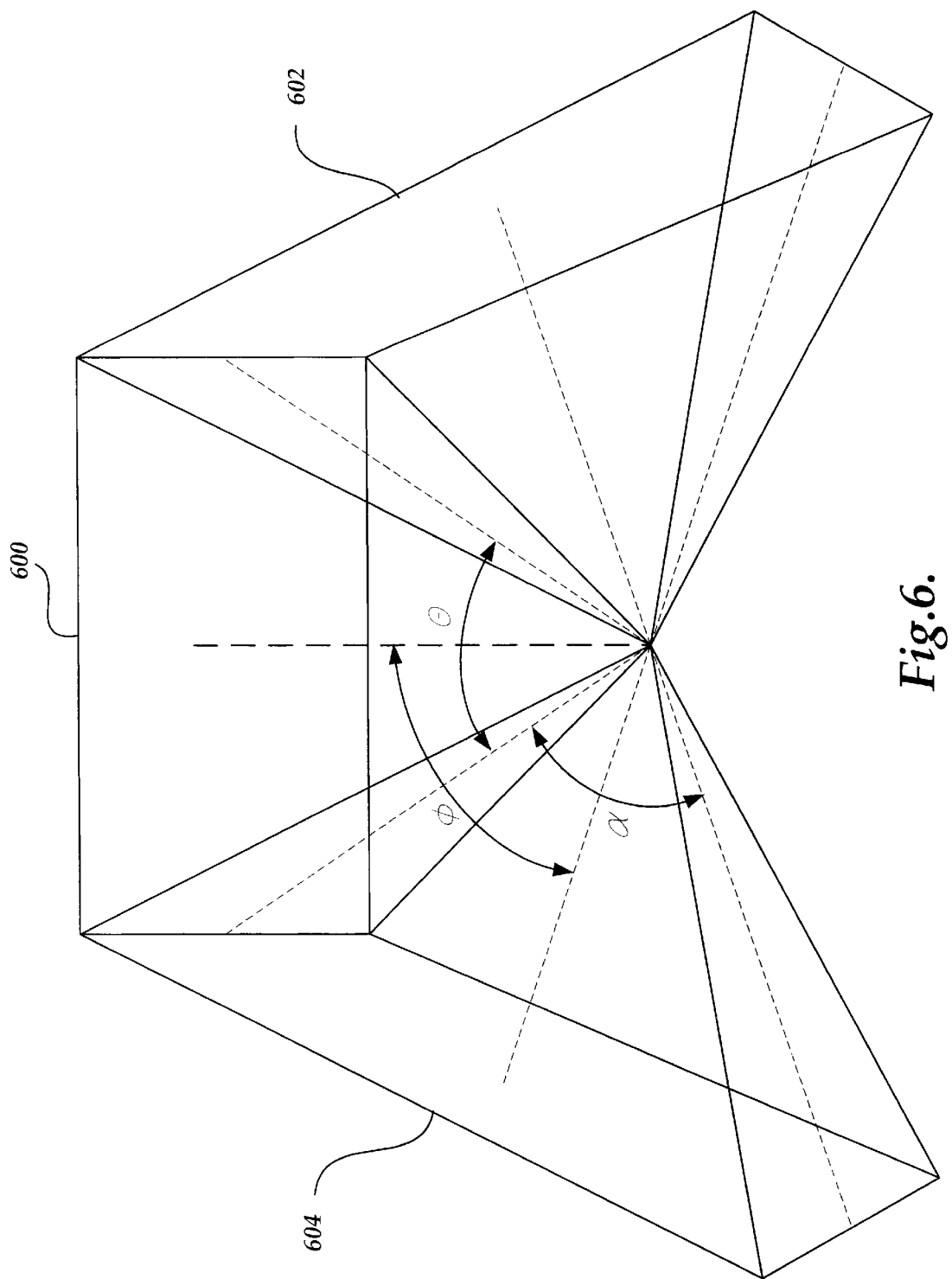
FIG. 6 depicts the configuration of peripheral lenses in a first alternative of the preferred embodiment.

FIG. 6 depicts lens configuration for a first alternative of the preferred embodiment of the present invention. In this first alternative, a viewing frustum 600 is defined for the main view, and separate viewing frustums 602 and 604 are defined for the right peripheral lens and left peripheral lens, respectively. The default vertical focal angle of each lens is 35° and the horizontal focal angle (θ) of the main view is 42°. The default aspect ratio is 1.2:1 of each lens wherein the aspect ratio defines the ratio of width to height. The lens angle is adjustable. The lens angle may be limited (e.g., between 30° and 60°), and has a default value of 42°. The lens angle (φ) refers to the angle between the normal of the main viewing frustum and the normal of the lens of the viewing frustum. As the lens angle is adjusted, the aspect ratio of each lens must be changed so that the effective horizontal focal angle of the lens (α) is maintained as follows: α=2φ−θ

Figure 7:
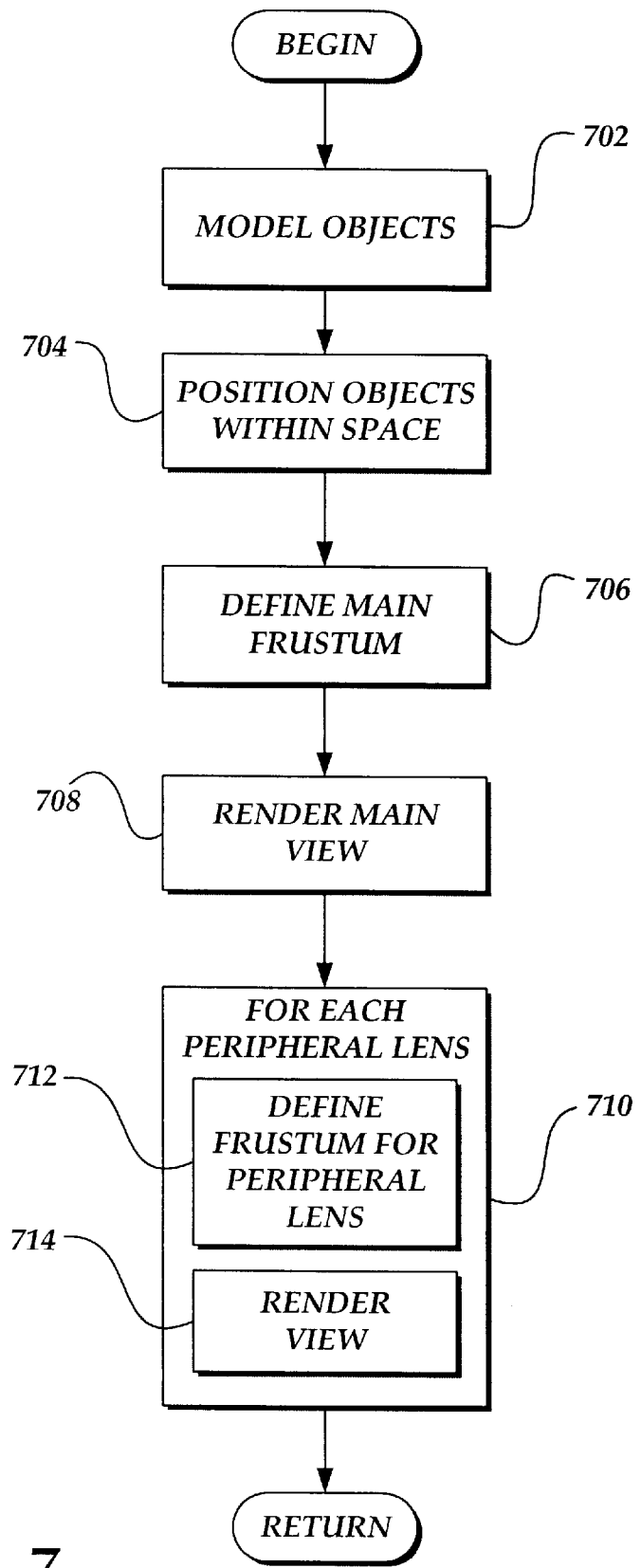
FIG. 7 is a flowchart illustrating the steps that are performed by the first alternative of the preferred embodiment of the present invention.

FIG. 7 is a flowchart that illustrates the steps that are performed to use the peripheral lenses in accordance with this first alternative of the preferred embodiment of the present invention. Initially, objects within the three dimensional scene (e.g., the hallway shown in FIG. 5A) are modeled using conventional techniques like those discussed in the Background of the Invention (step 702 in FIG. 7). These objects may include objects that are found on virtual desktops including windows and icons. Objects may be modeled, for example, as combinations of polygons or as triangular meshes. These objects are then positioned within the virtual space (step 704 in FIG. 7). The graphics library 420 includes functions for modeling the objects and for positioning the objects within the virtual space. The main viewing frustum 600 is then defined (step 706 in FIG. 7). So that the main view may then be rendered (step 708 in FIG. 7). The graphics library 420 includes functions for defining a frustum and for rendering a view relative to the frustum. These functions may be called to perform steps 706 and 708. For each peripheral lens, a number of steps 710 are then performed. First, a frustum is defined for each peripheral lens. For the example in which a left peripheral lens and a right peripheral lens are provided, two separate frustums are provided for these respective peripheral lenses. The frustum for the left peripheral lens and the frustum for the right peripheral lens each share a common boundary with the main viewing frustum as shown in FIG. 6. Once these frustums are defined, views for the respective frustums are rendered (step 714 in FIG. 7). As a result, a main view and peripheral lenses views are output on the video display 408 to assist the viewer in navigating within the virtual space.

It should be appreciated that the views provided by the peripheral lenses are generally continuous. In other words, the portions of the three dimensional space that are depicted by the main view and the peripheral lenses views are contiguous. No portions of the three dimensional space are omitted and no portions of the three dimensional space are redundant within the views. In the example shown in FIG. 5B, boundaries 506 have been added to clearly delineate the boundaries between the main view and the peripheral lenses views. Such boundaries 506 are not necessary to practice the present invention. The portion of the scene displayed within each of the views 500, 502, and 504 is uniform relative to the respective view. Those skilled in the art will appreciate that the respective views 500, 502, and 504 may have different resolutions. This approach corresponds to resolution in the human eye in that the human eye has lower resolution at its horizontal periphery. It should also be noted that when changing the desired direction and position of the user in the scene, the multiple aligned frustums must be moved together.

Figure 8:
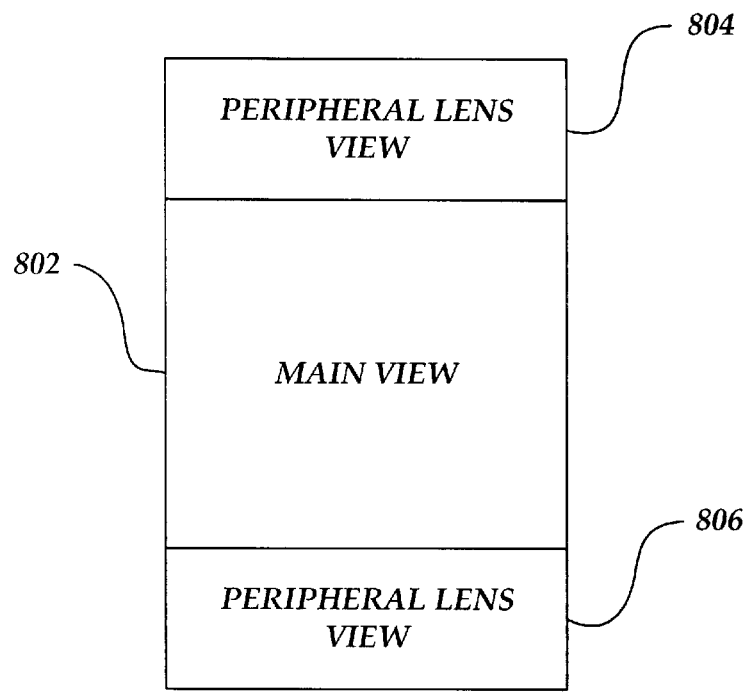
FIG. 8 is a block diagram illustrating an example peripheral lens configuration in which peripheral lenses are displayed above and below a main view.
Figure 9:
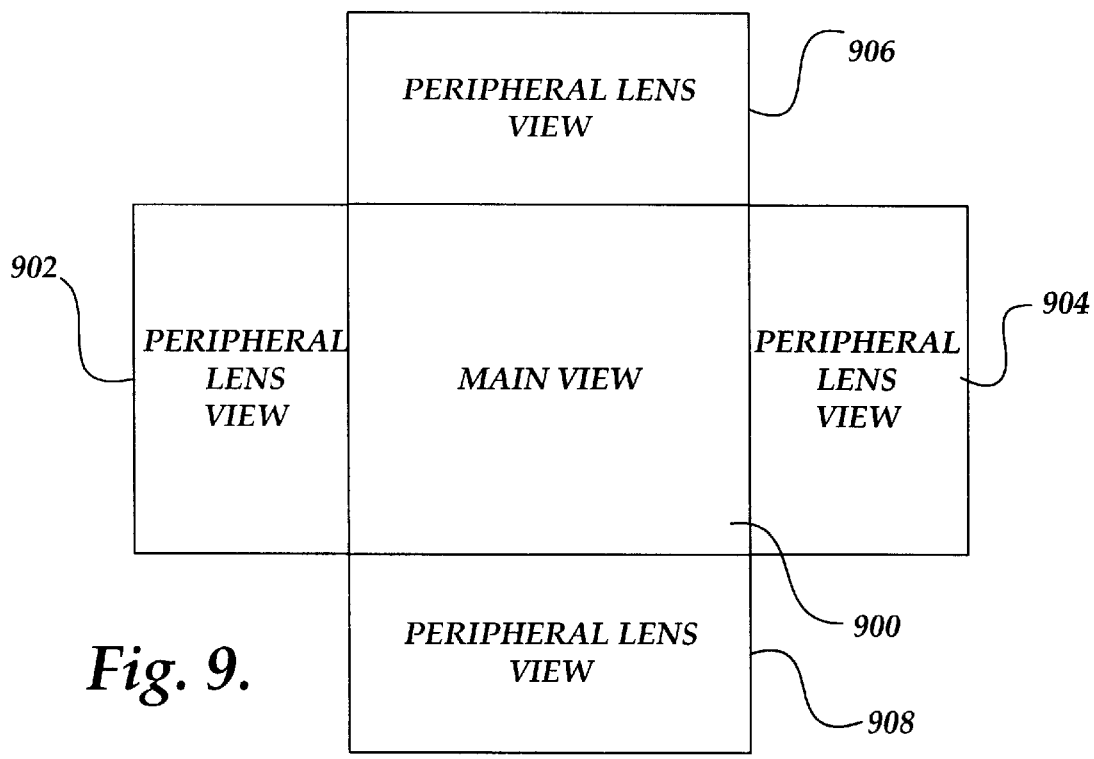
FIG. 9 depicts an example peripheral lens configuration wherein peripheral lenses are depicted on all four sides of a main view.

It should be appreciated that the present invention is not limited to being practiced solely with a left peripheral lens and a right peripheral lens. For example, FIG. 8 depicts an instance wherein the peripheral lenses are not positioned to the left and right of the main view. Peripheral lenses 804 and 806 are located above and below the main view 802, respectively. FIG. 9 depicts another alternative in which a main view 900 is surrounded by four peripheral lens views 902, 904, 906, and 908. Peripheral lenses 902 and 904 are positioned to the left and right of the main view 900 and peripheral lenses 906 and 908 are positioned above and below the main view 900. In such an instance, four frustums must be defined for the respective peripheral lenses.

Figure 10:
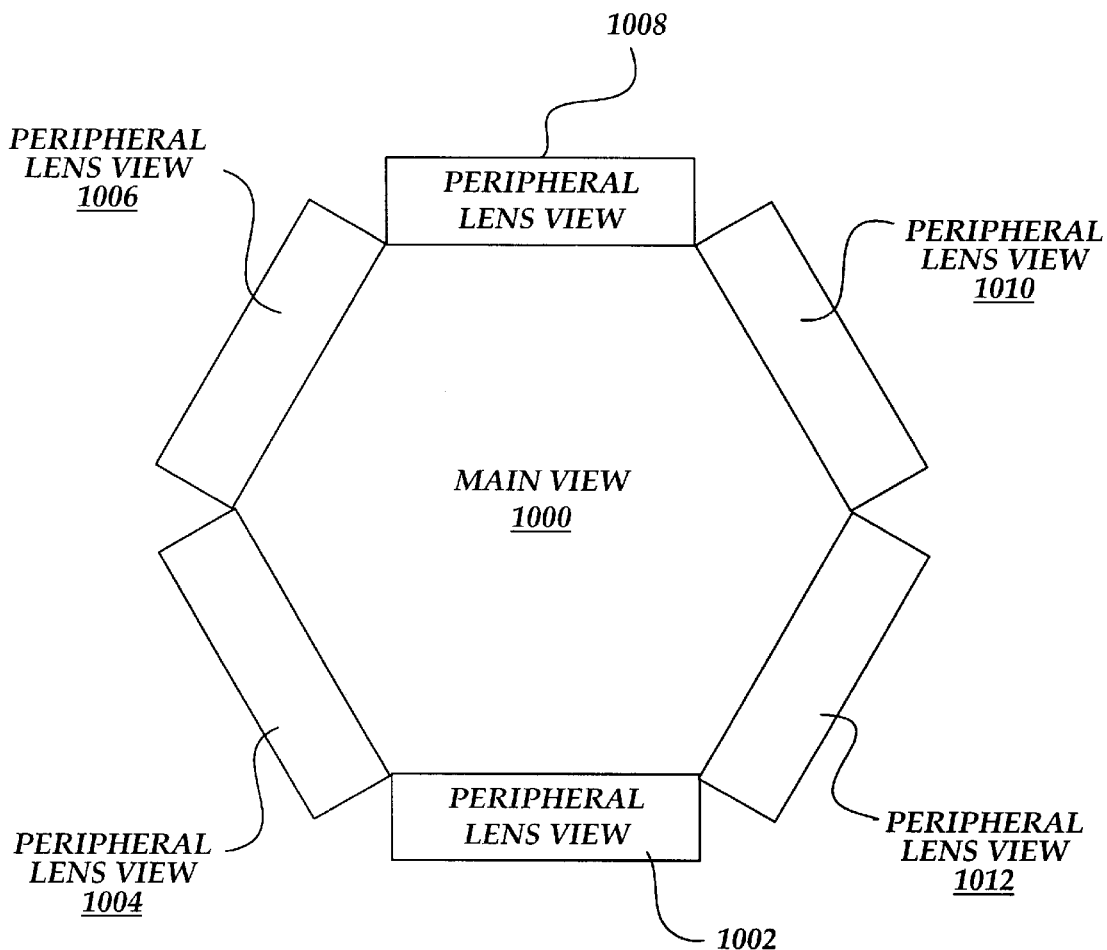
FIG. 10 depicts an example peripheral lens configuration wherein six peripheral lenses are provided along the edges of a hexagonal main view.

FIG. 10 depicts another alternative in which six peripheral lens views 1002, 1004, 1006, 1008, 1110, and 1112 surround a main view 1000. In this instance, the main view is also not rectangular but rather is hexagonal in shape. In such a case, seven viewing frustums must be defined for the six peripheral lenses and the main view.

Those skilled in the art will appreciate that any number of peripheral lenses may be utilized in the present invention. Moreover, the main view is not limited to a rectangular shape. Similarly, the peripheral lens view are not limited to a given shape or size. Different peripheral lenses may have different resolutions relative to each other and the main view. These lenses may also have different fields of view.

Figure 11:
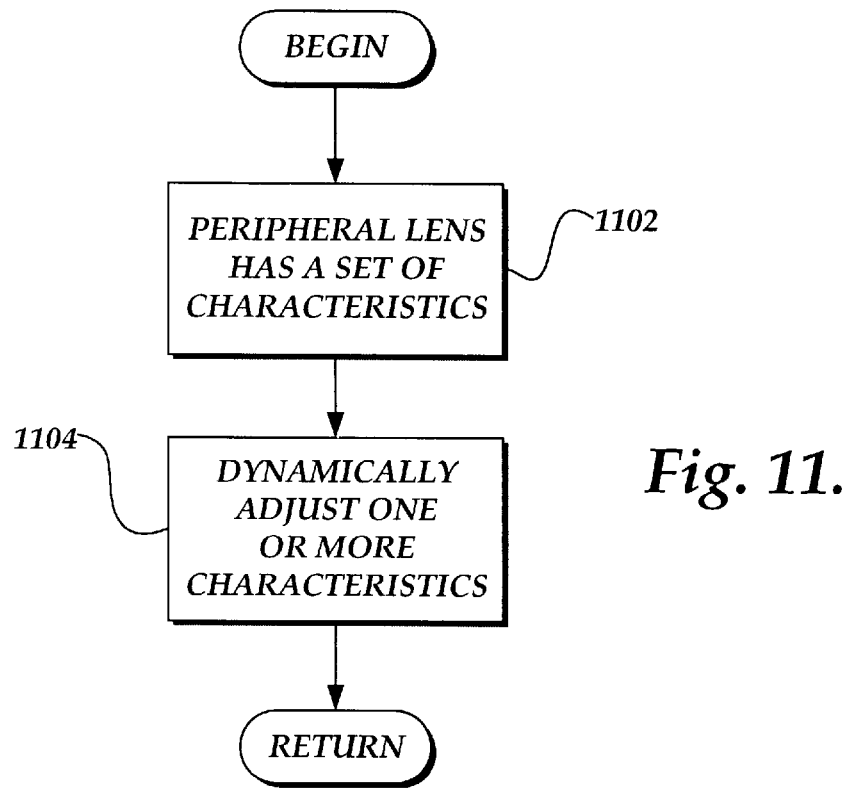
FIG. 11 is a flowchart illustrating the steps that are performed to dynamically alter the characteristics of a peripheral lens.

The peripheral lenses need not be static; rather, the peripheral lenses may be dynamically adjusted. The adjusting may be in the response to certain events, such as the expiration of a timer or the navigation of a user within the three dimensional virtual space. As is shown in FIG. 11, a peripheral lens has an initial set of characteristics (step 1102 in FIG. 11). These characteristics may include size, shape, and resolution. One or more of these characteristics may then be dynamically adjusted (step 1104 in FIG. 11) to assist a viewer in navigating within the space.

Figure 12:
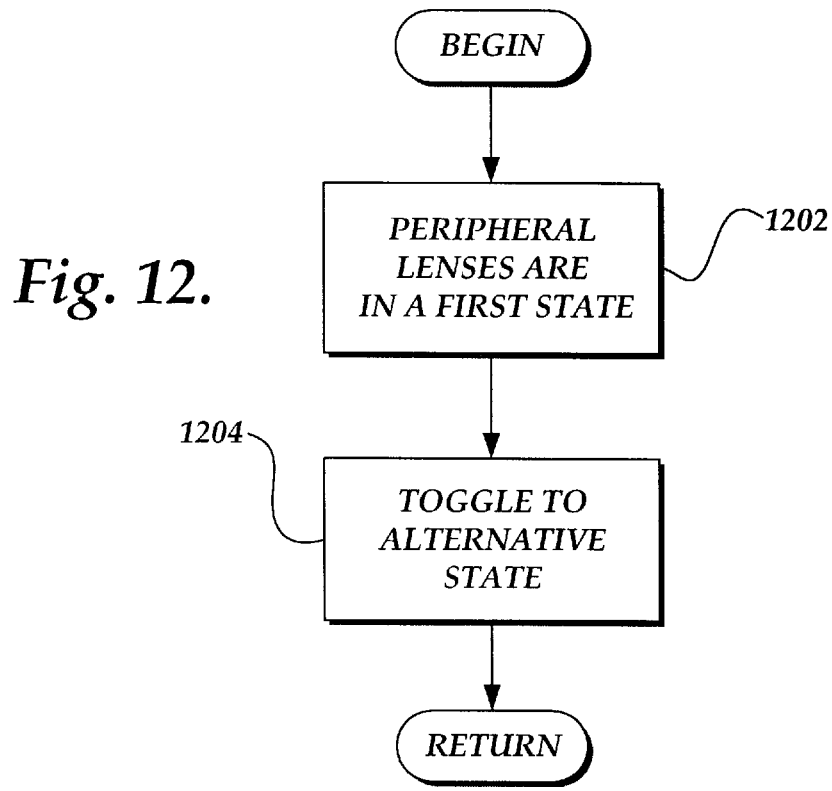
FIG. 12 is a flowchart illustrating the steps that are performed to toggle the state of a peripheral lens.

It should also be appreciated that the peripheral lenses need not always be active. As shown in FIG. 12, the peripheral lenses are initially in a first state (i.e., "ON" or "OFF"). When the peripheral lenses are "ON," they are visible and yield a peripheral lens view. However, when the peripheral lenses are "OFF," no view is yielded from the peripheral lens. The state of a peripheral lens may be toggled to the alternative state (step 1204 in FIG. 12). For example, a peripheral lens may be toggled from "ON" to "OFF" or from "OFF" to "ON."

In a second alternative, multiple viewing frustums are not utilized. Instead, a reflective object is positioned within the three dimensional virtual space and the reflective object is shaped so as to yield peripheral views of the space relative to a main view. A view of the reflection from the object is obtained and displayed to the user. The view of the reflective object includes a main view portion and peripheral lens view portions.

Figure 13:
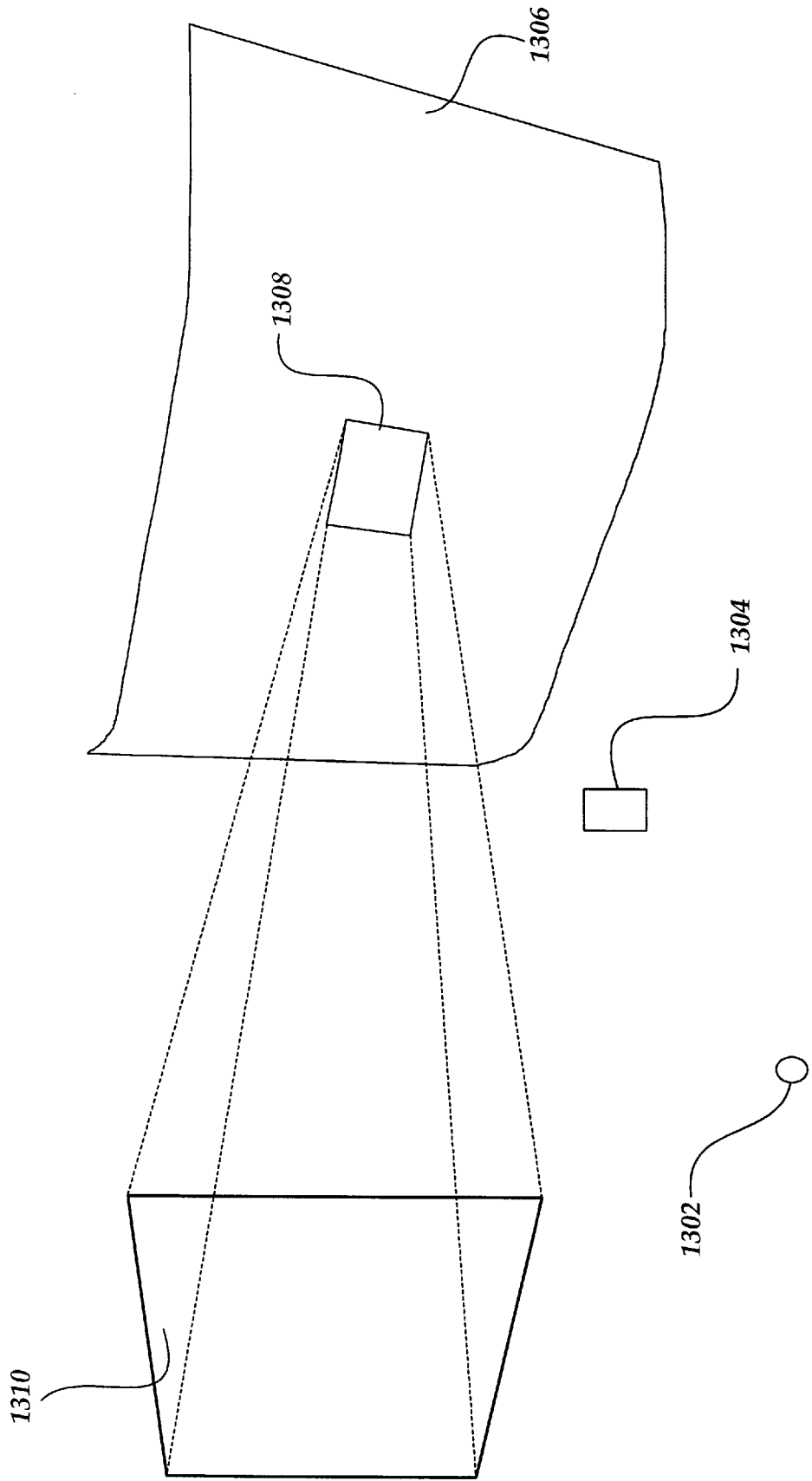
FIG. 13 is a diagram that illustrates the environmental mapping of a pixel.

This second alternative utilizes environment mapping (also known as "reflection mapping"). In environment mapping, an array of intensity values are defined that describe the environment surrounding an object. In this instance, the object is the reflective object that is placed within the three dimensional space. The intensity values are mapped onto the object in relation to the viewing direction. As is shown in FIG. 13 with environment mapping, to render the surface of an object, a pixel area 1304 is projected onto an environment mapping 1310 relative to a reflection from a projection reference point 1302.

Figure 14:
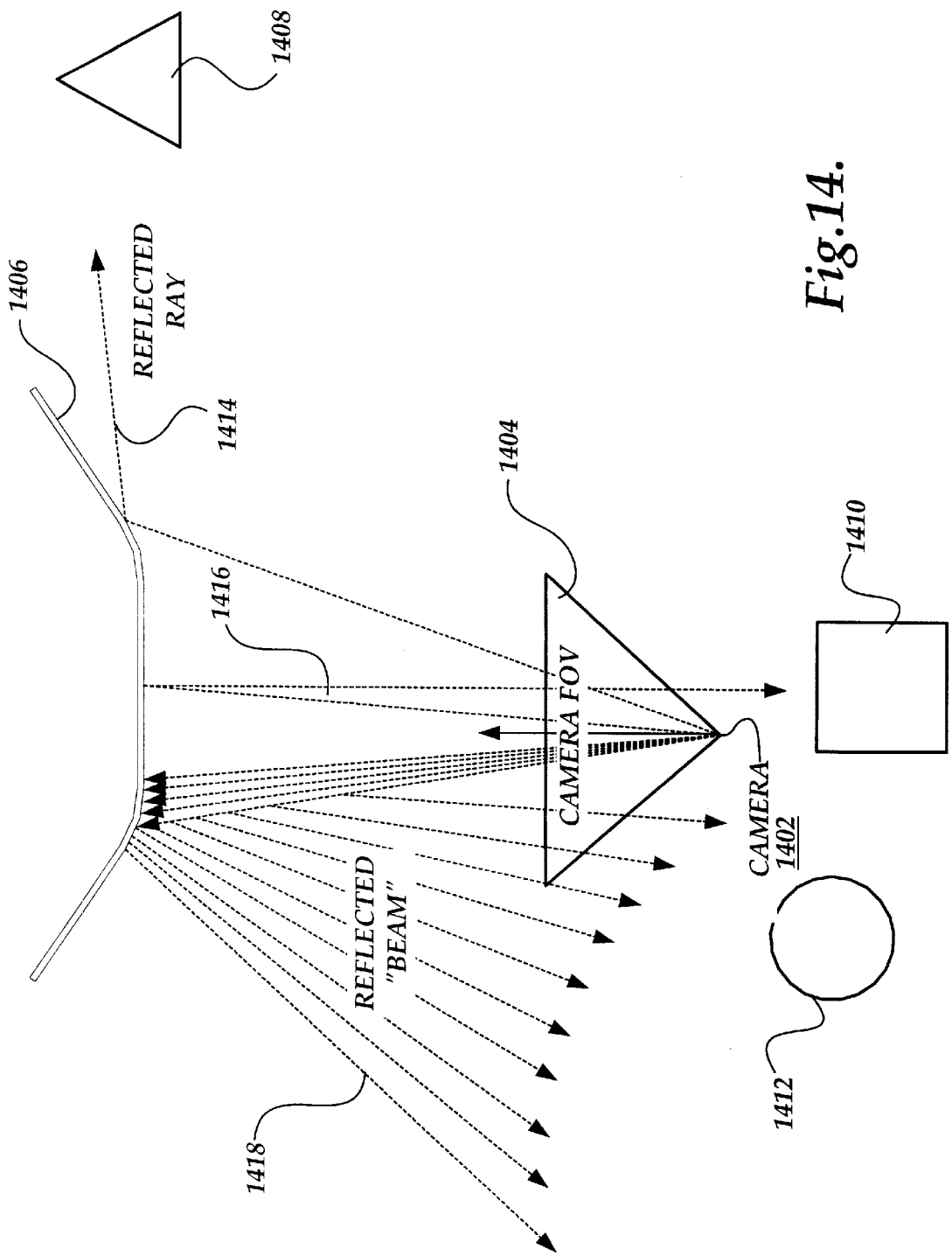
FIG. 14 depicts an example of the use of a reflective object in the second alternative of the preferred embodiment of the present invention.

FIG. 14 shows an example in which a reflective object 1406 is constructed from a curved surface to provide left and right peripheral lenses, such as was provided in the first alternative discussed above. FIG. 14 shows an example that includes a curved shaped reflective object. In the example shown in FIG. 14, a gradually curved reflective surface 1406 is used to obtain the reflection of objects 1408, 1410 and 1412 in the scene. As can be seen in FIG. 14, there is a smooth transition between the reflected image from the central region and the side regions. The view shown in FIG. 14 is a plan view (i.e., a view from above). The view may be determined by employing a camera analogy wherein a camera 1402 having a field of view 1404 is pointed at the reflective surface 1406. Thus, the reflection of the objects 1408, 1410, 1412 off of the reflective object 1406 is received by the camera 1402. The resulting view is what is rendered by the computer system 400 on the view display 408.

Figure 15:
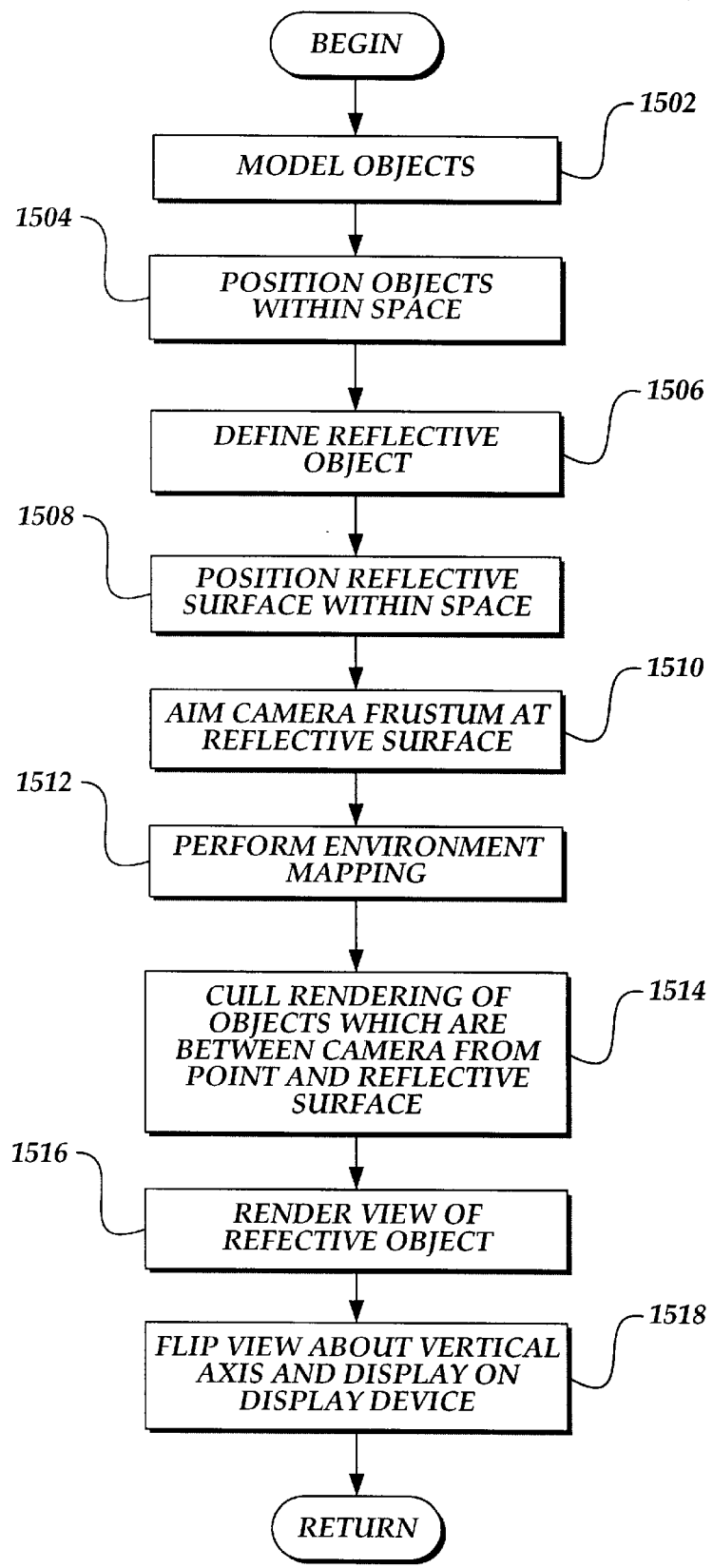
FIG. 15 is a flow chart illustrating the steps that are performed in the second alternative of the preferred embodiment of the present invention.
Figure 16:
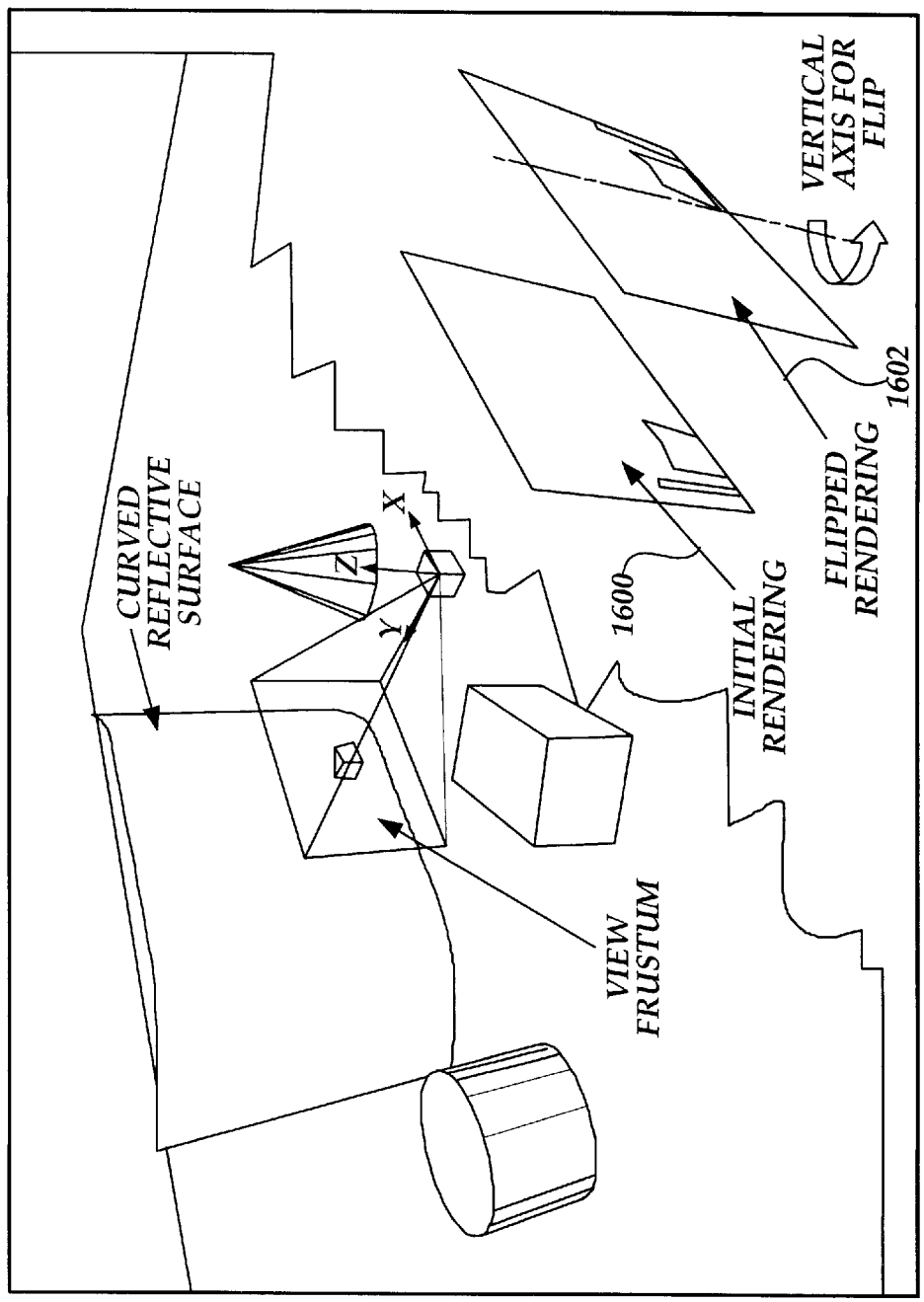
FIG. 16 shows the scene of FIG. 14 but shows the opposite orientations of the direction of the rendered view and the orientation of the frustum.

FIG. 15 is a flowchart illustrating the steps that are performed in this second alternative. Initially, as in the first alternative, the objects 1408, 1410 and 1412 are modeled (step 1502 in FIG. 15). These objects are then positioned within the space (step 1504 in FIG. 5). The modeling of the objects and the positioning of the objects with a space may be used by employing conventional techniques that are available via the graphics library 420. The reflective object 1406 is then defined (step 1506 in FIG. 15). The shape of the reflective object and position relative to the view frustum determines the views provided as a result of the reflection. As was mentioned in the discussion of using reflective surfaces, the depiction in FIG. 14 provides left and right peripheral lenses via the angled parts of the surface. The reflective object 1406, in this instance, is formed by a curved surface. This can be represented via a spline surface and approximated via a collection of polygons. A curved surface is used rather than planar surfaces in order to provide a perception of a continuous reflection (i.e., the outermost regions appear to be contiguous with the central region). The outermost regions correspond to two peripheral lenses. As will be described in more detail below, the shape of the reflective object 1406 may be varied to produce different views. This reflective object is then positioned within this three dimensional virtual space (step 1508 in FIG. 15). The camera frustum is then aimed at the reflective surface (step 1510 in FIG. 15). Environment mapping is performed to determine what the reflections of the objects 1408, 1410 and 1412 off of the reflective object 1406 will look like to the camera 1402 (step 1512 in FIG. 15). It must also be noted that objects which fall between the region between the camera frustum origin and the reflective surface should not be rendered directly by the camera. To prevent this any of the commonly used culling algorithms may be used (step 1514 in FIG. 15). The resulting view off the reflective object 1406 that is received by the camera 1402 is rendered (step 1516 in FIG. 15). As can be seen in the illustration in FIG. 14, objects 1410 and 1412 appear within the main view but object 1408 appears in one of the peripheral views. FIG. 14 shows the reflective ray 1414 for object 1408 and the reflective ray 1416 for object 1410. FIG. 14 also shows the reflective beam 1418 for the object 1412, which is an abstraction of a collection of rays. The results described so far leave an image that is a mirror reversal of the desired image (see 1600 and 1602 in FIG. 16). In order to correct for this, a final step involves flipping the image around the center vertical axis (step 1518 in FIG. 15).

Figure 17:
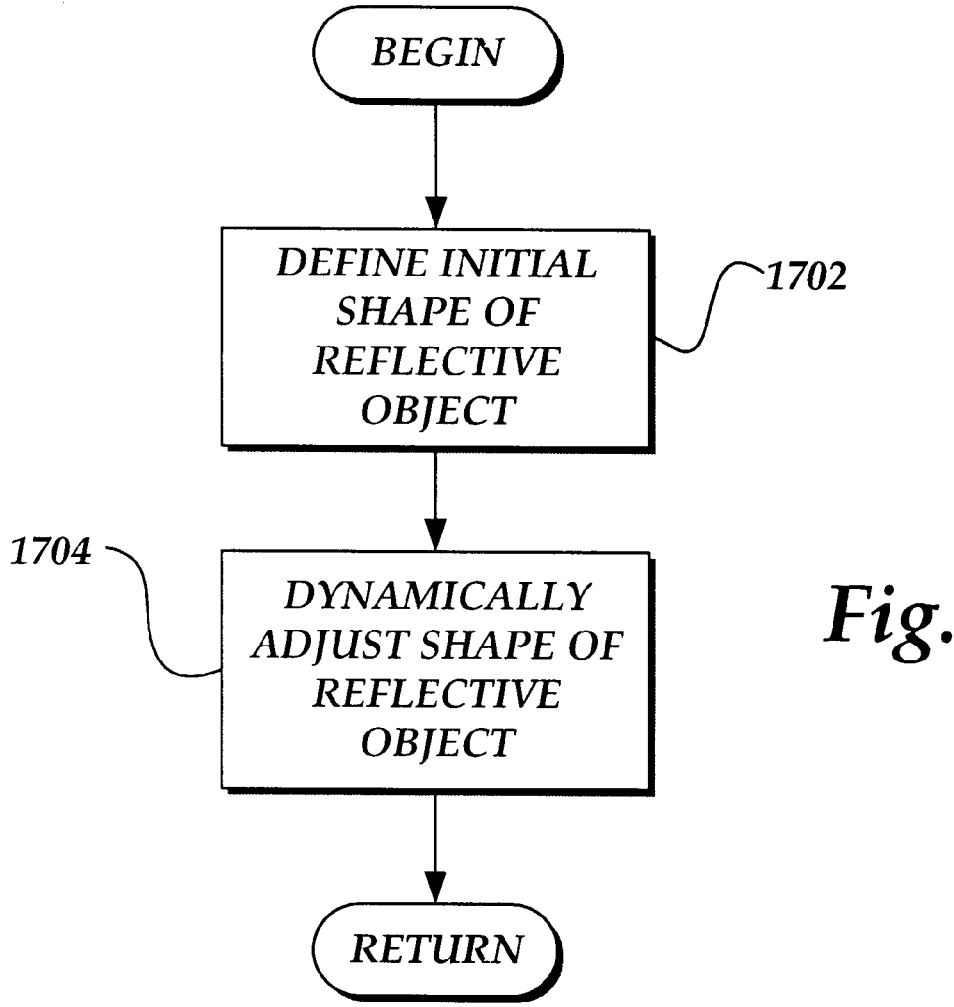
FIG. 17 is a flowchart illustrating the steps that are performed to dynamically alter a reflective object in the second alternative of the preferred embodiment to the present invention.

Those skilled in the art will appreciate that any of a multitude of different shapes for a reflective surface are permissible. Those skilled in the art will appreciate that the reflective surface may not only vary along one dimension, but rather may vary in all three dimensions. It is up to the programmer that is developing the views of the scene to determine the surface of the reflective object. It should also be appreciated that the shape of the reflective object need not be static. As shown in FIG. 17, an initial shape of the reflective object may be defined. Subsequently, the shape of the reflective object may be dynamically adjusted in response to events or other activities (step 1704 in FIG. 17). This change in shape of the reflective object may result in different views at different peripheral lenses. The shape may also produce changes in the size of the reflective object.

While the present invention has been described with reference to a preferred embodiment thereof, those skilled in the art will appreciate that various changes in the form and detail may be performed without departing from the intended scope of the present invention. For example, different peripheral lens configurations other than that shown for the first embodiment may be employed. Moreover, differently shaped reflective objects may be used in the second alternative of the preferred embodiment of the present invention. The peripheral lenses may be turned on or off and may have differing degrees of resolution. Further, multiple reflective objects may be employed.

We claim:

1. In a computer system having a display device, a method comprising the computer-implemented steps of:

provonding a scene holding at least one object;

defining a main view of the scene that depicts a main portion of the scene;

defining a first peripheral lens view of the scene that is angularly offset relative to the main view of the scene and that shows a first peripheral portion of the scene that directly abuts the main portion of the scene; and rendering the main view and the first peripheral lens view together on the display device.

2. The method of claim 1, further comprising the steps of:

defining a second peripheral lens view of the scene that is angularly offset relative to the main view of the scene and that shows a second peripheral portion of the scene that directly abuts the main portion of the scene and that does not overlap with the first peripheral portion of the scene; and rendering the second peripheral lens view on the display device along with the main view and the peripheral lens view.

3. The method of claim 1 wherein the first peripheral lens view has a substantially same height as the main view.

4. The method of claim 1 wherein the first peripheral lens view has a substantially lesser width as the main view.

5. The method of claim 1 wherein the peripheral lens view is angularly offset relative to the main view in range between thirty degrees to sixty degrees.

6. The method of claim 1 wherein the scene is a three dimensional scene.

7. The method of claim 1 wherein the main view is rectangular.

8. The method of claim 7 wherein the first peripheral lens view is rectangular.

9. The method of claim 1, further comprising the step of dynamically altering an angular offset of the first peripheral lens relative to the main view.

10. The method of claim 9 wherein the first peripheral lens has a horizontal field of view and wherein the horizontal field of view of the first peripheral lens is adjusted when the angular offset is dynamically altered to insure that perceived images in the first peripheral lens view and the main view are contiguous.

11. The method of claim 1 wherein resolution of the main view differs from the resolution of the first peripheral lens view.

12. In a computer system having an output device, a method comprising the steps of:

modeling a scene that includes at least one object;

defining a first viewing frustum for the scene to define a main view of the scene, wherein the first viewing frustum includes boundaries;

defining a second viewing frustum for the scene to define a first peripheral lens view of the scene, wherein the second viewing frustum includes boundaries and at least one of said boundaries of the second viewing frustum being a shared boundary that is also a boundary of first viewing frustum;

outputting the main view of the scene together with the first peripheral lens view of the scene on the output device.

13. The method of claim 12 wherein the scene is a three dimensional scene.

14. The method of claim 12, further comprising the steps of:

defining a third viewing frustum for the scene to define a second peripheral lens view of the scene;

outputting the second peripheral lens view on the output device along with the main view and the first peripheral lens view.

15. The method of claim 14 wherein the third viewing frustum includes boundaries and wherein one of the boundaries is also a boundary of the first viewing frustum and not a boundary of the second viewing frustum.

16. The method of claim 15 wherein the main view has a left side edge and a right side edge and wherein the first peripheral lens view and the second peripheral lens view are output to be positioned adjacent to the left side edge and right side edge of the main view, respectively.

17. The method of claim 15 wherein the main view has a top side edge and a bottom side edge and wherein the first peripheral lens view and the second peripheral lens view are output to be positioned adjacent to the top side edge and the bottom side edge of the main view, respectively.

18. The method of claim 15 wherein the second viewing frustum and the third viewing frustum are angularly offset relative to the first viewing frustum by a like angular magnitude.

19. In a computer system that includes a display device, a method comprising the computer-implemented steps of:

modeling a three dimensional scene that includes at least one object;

adding a reflective object to the scene, said reflective object including a first portion for reflecting a main view of the scene and a second portion for reflecting a peripheral view of the scene, said second portion being angularly offset relative to said first portion;

identifying the main view of the scene and the peripheral view of the scene by performing environment mapping; and displaying the identified main view of the scene and the identified peripheral view of the scene on the display device.

20. The method of claim 19 wherein the reflective object includes a third portion for reflecting an additional peripheral view of the scene and wherein the method further comprises identifying the additional peripheral view of the scene by performing environment mapping and displaying the identified additional view of the scene on the display device along with the identified main view and the identified peripheral view.

21. The method of claim 19, further comprising the step of dynamically altering a shape of the reflective object.

22. The method of claim 21, further comprising the steps of identifying the main view of the scene and the peripheral view of the scene by applying environment mapping to the reflective object after the reflective object is dynamically altered.

23. The method of claim 19 wherein the reflective object includes a curved surface.

24. In a computer system having a display device, a method comprising the steps of:

providing a model of a three dimensional space that includes an object;

defining a main view of the scene that depicts a main portion of the scene;

providing a peripheral lens that provides a peripheral view of the scene that depicts a peripheral portion of the scene that is immediately adjacent to the main view; and seamlessly rendering the main view with the peripheral view on the display device.

25. The method of claim 24 wherein the peripheral lens has a shape and wherein the method further comprises the steps of dynamically altering the shape of the peripheral lens and again rendering the main view with the peripheral view on the display device.

26. The method of claim 24 wherein the peripheral lens has a size and wherein the method further comprises the steps of dynamically altering the size of the peripheral lens and again rendering the main view with the peripheral view on the display device.

27. The method of claim 24, further comprising the step of no longer receiving the peripheral view so that the main view is rendered on the display device without the peripheral view.

28. The method of claim 24 wherein the peripheral view has an angular offset relative to the main view and wherein the angular offset is dynamically altered.

29. The method of claim 28 wherein the peripheral lens has a horizontal field of view and wherein the horizontal field of view is adjusted in response to the angular offset being adjusted to insure that perceived images in the main view and the peripheral view are contiguous.

30. In a computer system having a display device and a model of a scene holding at least one object, a computer-readable medium holding computer-executable instructions for performing, a method comprising the computer-implemented steps of:
defining a main view of the scene that depicts a main portion of the scene;
defining a first peripheral lens view of the scene that is angularly offset relative to the main view of the scene and that shows a first peripheral portion of the scene that directly abuts the main portion of the scene; and
rendering the main view and the first peripheral lens view together on the display device.

31. The computer-readable medium of claim 30 wherein the method further comprises the steps of:
defining a second peripheral lens view of the scene that is angularly offset relative to the main view of the scene and that shows a second peripheral portion of the scene that directly abuts the main portion of the scene and that does not overlap with the first peripheral portion of the scene; and
rendering the second peripheral lens view on the display device along with the main view and the peripheral lens view.

32. The computer-readable medium of claim 30 wherein the first peripheral lens view has a substantially same height as the main view.

33. The computer-readable medium of claim 30 wherein the first peripheral lens view has a substantially lesser width as the main view.

34. The computer-readable medium of claim 30 wherein the scene is a three dimensional scene.

35. The computer-readable medium of claim 30 wherein the main view is rectangular.

36. The computer-readable medium of claim 30, wherein the method further comprises the step of dynamically altering an angular offset of the first peripheral lens relative to the main view.

37. The computer-readable medium of claim 36 wherein the first peripheral lens has a horizontal field of view and wherein the horizontal field of view of the first peripheral lens is adjusted when the angular offset is dynamically altered to insure that perceived images in the first peripheral lens view and the main view are contiguous.

38. The computer-readable medium of claim 30 wherein resolution of the main view differs from the resolution of the first peripheral lens view.

39. In a computer system having an output device, a computer-readable medium holding computer-executable instructions for performing a method comprising the steps of:
modeling a scene that includes at least one object;
defining a first viewing frustum for the scene to define a main view of the scene, wherein the first viewing frustum includes boundaries;
defining a second viewing frustum for the scene to define a first peripheral lens view of the scene, wherein the second viewing frustum includes boundaries and at least one of said boundaries of the second viewing frustum being a shared boundary that is also a boundary of first viewing frustum;
outputting the main view of the scene together with the first peripheral lens view of the scene on the output device.

40. The computer-readable medium of claim 39 wherein the scene is a three dimensional scene.

41. The computer-readable medium of claim 39 wherein the method further comprises the steps of:
defining a third viewing frustum for the scene to define a second peripheral lens view of the scene; and
outputting the second peripheral lens view on the output device along with the main view and the first peripheral lens view.

42. The computer-readable medium of claim 41 wherein the third viewing frustum includes boundaries and wherein one of the boundaries is being a boundary of the first viewing frustum and is not a boundary of the second viewing frustum in the given dimension.

43. The computer-readable medium of claim 42 wherein the first peripheral lens view and the second peripheral lens view are output to be positioned adjacent to the left side edge and right side edge of the main view, respectively.

44. The computer-readable medium of claim 42 wherein the main view has a top side edge and a bottom side edge and wherein the first peripheral lens view and the second peripheral lens view are output to be positioned adjacent to the top side edge and the bottom side edge of the main view, respectively.

45. The computer-readable medium of claim 42 wherein the second viewing frustum and the third viewing frustum are angularly offset relative to the first viewing frustum by a like angular magnitude.

46. In a computer system that includes a display device, a computer-readable medium holding computer-executable instructions for performing a method comprising the computer-implemented steps of:
modeling a three dimensional scene that includes at least one object;
adding a reflective object to the scene, said reflective object including a first portion for reflecting a main view of the scene and a second portion for reflecting a peripheral view of the scene, said second portion being angularly offset relative to said first portion;
identifying the main view of the scene and the peripheral view of the scene by performing environment mapping; and
displaying the identified main view of the scene and the identified peripheral view of the scene on the display device.

47. The computer-readable medium of claim 46 wherein the reflective object includes a third portion for reflecting an additional peripheral view of scene and wherein the method further comprises identifying the additional peripheral view of the scene by performing environment mapping and displaying the identified additional view of the scene on the display device along with the identified main view and the identified peripheral view.

48. The computer-readable medium of claim 46 wherein the method further comprises the step of dynamically altering a shape of the reflective object.

49. The computer-readable medium of claim 46 wherein the reflective object includes a curved surface.

50. In a computer system having a display device, a computer-readable medium holding computer-executable instructions for performing a method comprising the steps of:

providing a model of a three dimensional space that includes an object;

defining a main view of the scene that depicts a main portion of the scene;

providing a peripheral lens that provides a peripheral view of the scene that depicts a peripheral portion of the scene that is immediately adjacent to the main view; and seamlessly rendering the main view with the peripheral view on the display device.

51. The computer-readable medium of claim 50 wherein the peripheral lens has a size and wherein the method further comprises the steps of dynamically altering the size of the peripheral lens and again rendering the main view with the peripheral view on the display device.

52. The computer-readable medium of claim 50, further comprising the step of no longer receiving the peripheral view so that the main view is rendered on the display device without the peripheral view.

* * * * *

UNITED STATES PATENT AND TRADEMARK OFFICE
CERTIFICATE OF CORRECTION

PATENT NO.    : 5,949,430
DATED         : September 7, 1999
INVENTOR(S)   : G.G. Robertson et al.

It is certified that error appears in the above-identified patent and that said Letters Patent is hereby corrected as shown below:

Column 2,
Line 36, after "lenses" delete ","
Line 38, "which through" should read -- through which --

Column 6,
Line 8, "FIG.7). So", should read --FIG.7) so --

Column 7,
Line 66, "with a space" should read -- within a space --

Column 9,
Line 30, after "view in" insert -- a --
Line 44, "insure" should -- ensure --
Line 62, after "of" insert -- the --

Column 11,
Line 23, "insure" should -- ensure --
Line 28, after "performing" delete ","

Column 12,
Line 1, "insure" should -- ensure --

UNITED STATES PATENT AND TRADEMARK OFFICE
CERTIFICATE OF CORRECTION

PATENT NO. : 5,949,430
DATED : September 7, 1999
INVENTOR(S) : G.G. Robertson et al.

It is certified that error appears in the above-identified patent and that said Letters Patent is hereby corrected as shown below:

Column 12, (continued)
Line 18, before "first viewing" insert -- the --
Line 34, after "boundaries is" delete "being"

Column 13,
Line 3, after "view of" insert -- the --

Signed and Sealed this

Fourteenth Day of August, 2001

*Attest:*

NICHOLAS P. GODICI
*Attesting Officer*   Acting Director of the United States Patent and Trademark Office